United States Patent
Blomgren

(10) Patent No.: US 9,958,221 B2
(45) Date of Patent: May 1, 2018

(54) DEVICE FOR CHANGING A FLOW DIRECTION THROUGH A HEAT EXCHANGER AND USE THEREOF

(71) Applicant: MARINNOVATION HB, Falsterbo (SE)

(72) Inventor: Ralf Blomgren, Falsterbo (SE)

(73) Assignee: Marinnovation HB, Falsterbo (SE)

( * ) Notice: Subject to any disclaimer, the term of this patent is extended or adjusted under 35 U.S.C. 154(b) by 0 days. days.

(21) Appl. No.: 15/510,027

(22) PCT Filed: Aug. 25, 2015

(86) PCT No.: PCT/SE2015/050892
§ 371 (c)(1),
(2) Date: Mar. 9, 2017

(87) PCT Pub. No.: WO2016/039680
PCT Pub. Date: Mar. 17, 2016

(65) Prior Publication Data
US 2017/0254605 A1    Sep. 7, 2017

(30) Foreign Application Priority Data
Sep. 10, 2014 (SE) ...................................... 1451047

(51) Int. Cl.
*F28F 27/02* (2006.01)
*F28G 9/00* (2006.01)
*F16K 11/074* (2006.01)

(52) U.S. Cl.
CPC .............. *F28G 9/00* (2013.01); *F16K 11/074* (2013.01); *F28F 27/02* (2013.01)

(58) Field of Classification Search
CPC ........... F28G 9/00; F16K 11/074; F28F 27/02
(Continued)

(56) References Cited

U.S. PATENT DOCUMENTS 2,660,195 A * 11/1953 Risley .................. F16K 27/062
                                                      137/15.01
2,672,887 A *  3/1954 Tipton ................. F16K 11/065
                                                      137/625.43
(Continued)

FOREIGN PATENT DOCUMENTS

| | | |
|---|---|---|
| CA | 2 216 332 A1 | 3/1999 |
| GB | 1 435 230 A | 5/1976 |
| SE | 520 124 C2 | 5/2003 |

OTHER PUBLICATIONS

International Search Report dated Dec. 16, 2015 for corresponding application No. PCT/SE2015/050892.

*Primary Examiner* — Justin Jonaitis
(74) *Attorney, Agent, or Firm* — Renner, Otto, Boisselle & Sklar, LLP

(57) ABSTRACT

A device for changing a flow direction through a heat exchanger, comprising a valve housing and a rotatable valve member arranged inside the valve housing. The valve housing comprises first and second ends and a center axis (B) extending between them. The device comprises a first port, a second port, a third port and a fourth port. The first end is provided with the first port, and the second end is provided with the third and fourth ports, wherein the valve member is rotatable between a first position and a second position and, in the first position, defines a conduit between the first port and the third port and, in the second position, defines a conduit between the first port and the fourth port. The valve member is rotatable around an axis of rotation offset from the center axis (B) and extending through the center of the first port, and the first port is angularly displaced 90° around the center axis (B) in relation to the third and fourth ports.

12 Claims, 8 Drawing Sheets

Figure 1:
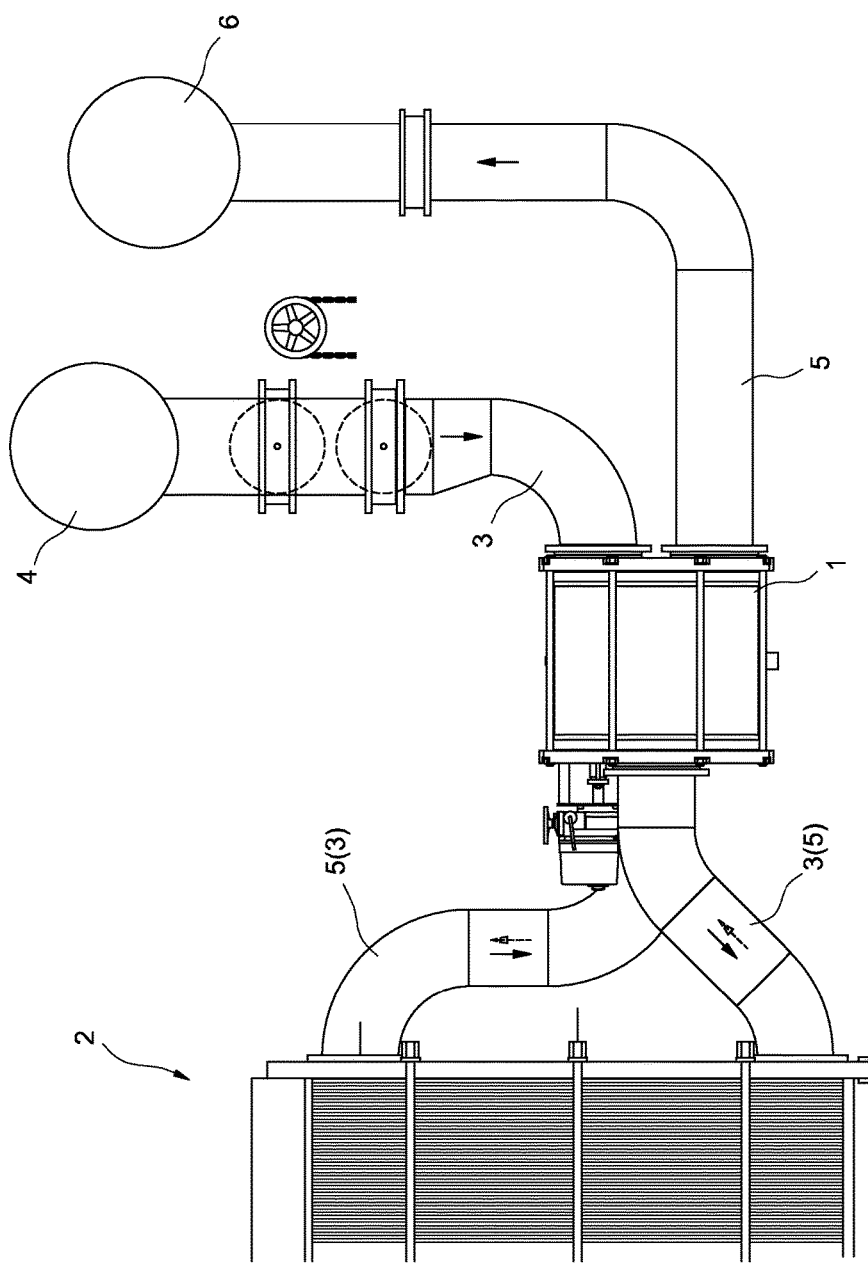

(58) Field of Classification Search
USPC .................................. 165/97, 96, DIG. 100
See application file for complete search history.

(56) References Cited

U.S. PATENT DOCUMENTS

| | | | | |
|---|---|---|---|---|
| 3,194,267 | A | * | 7/1965 | Lyon ..................... F16K 11/085 137/625.11 |
| 4,203,469 | A | | 5/1980 | Gates |
| 5,172,725 | A | * | 12/1992 | Kitagawa ............ F16K 11/0856 137/625.43 |
| 6,158,466 | A | * | 12/2000 | Riefler ................. F25B 41/046 137/625.43 |
| 7,631,661 | B2 | * | 12/2009 | Moreno ................ F16K 11/074 137/625.43 |
| 2006/0037654 | A1 | | 2/2006 | Moreno |

* cited by examiner

DEVICE FOR CHANGING A FLOW DIRECTION THROUGH A HEAT EXCHANGER AND USE THEREOF

This application is a national phase of International Application No. PCT/SE2015/050892 filed Aug. 25, 2015 and published in the English language.

FIELD OF THE INVENTION

The present invention relates to a device for changing a flow direction through a heat exchanger. Heat exchangers, and particularly plate heat exchangers, are used within industry for a variety of heat exchange applications. Heat exchangers exchange heat between a first medium and a second medium. One of the mediums, such as the first medium, or both of the mediums can comprise undesired material, such as objects, particles, fibres or similar, which can clog the heat exchanger. Examples of such a first medium are sea water, waste water and any other type of fluid or liquid containing particles or fibres. Plate heat exchangers have a relatively small gap between adjacent heat exchanger plates, wherein such particles and fibres easily can be stuck and prevent the first medium to pass through the heat exchanger properly. For example, in many plate heat exchangers the gap between adjacent heat exchanger plates is 2-5 mm, wherein undesired material easily can be stuck to clog the heat exchanger. To prevent clogging of heat exchangers sometimes a filter can be used. However, a device reversing the flow direction of the first medium through the heat exchanger during short periods of time can be more efficient. When the undesired material inside the heat exchanger impairs the operation thereof the flow direction can be reversed for a period of time to cleanse the heat exchanger and remove the undesired material.

The present invention also relates to the use of a device for reversing the flow direction of one medium through a heat exchanger, e.g. to remove undesired material from it.

PRIOR ART

There are different types of devices for changing the flow direction through a heat exchanger in the prior art. One type of prior art device for changing the flow direction of one medium through a plate heat exchanger is disclosed in SE520124. The device according to SE520124 comprises a valve housing and a plurality of rotatable conduits arranged inside the valve housing, wherein the conduits are rotatable between different ports in the valve housing to change the flow direction.

A problem with devices for changing flow direction through heat exchangers according to the prior art is that they are relatively large and require a lot of space. Hence, they can be difficult to install in existing plants.

Another problem with such prior art devices is that they are heavy and sometime cannot be installed in existing plants due to the extra weight applied on foundations or similar.

Another problem with such prior art devices is that they are expensive.

SUMMARY OF THE INVENTION

An object of the present invention is to avoid problems of the prior art and provide a small, light and cost efficient device for changing the flow direction of one medium through a heat exchanger, which more easily can be installed in existing plants.

The present invention relates to a device for changing a flow direction through a heat exchanger, comprising a valve housing and a rotatable valve member arranged inside the valve housing, said valve housing comprising a first end, a second end and a centre axis extending between said first and second ends, wherein the device comprises a first port, a second port, a third port and a fourth port, said first end being provided with the first port, and said second end being provided with the third port and the fourth port, wherein the valve member is rotatable between a first position and a second position and, in the first position, defines a conduit between the first port and the third port and, in the second position, defines a conduit between the first port and the fourth port, characterised in that the valve member is rotatable around an axis of rotation offset from the centre axis, said axis of rotation extending through the centre of the first port, and the first port is angularly displaced 90° around the centre axis in relation to the third and fourth ports. The second port can be arranged in the first end of the valve housing. Alternatively, the second port can be arranged at another location, such as perpendicular to the first port and, for example, in a lower part of the valve housing. The first port or the first and second ports in the first end of the valve housing being displaced around the centre axis in combination with the axis of rotation being offset from the centre axis results in that space is made for an exterior actuator on the second end of the valve housing while using the surface of the valve housing ends for the ports efficiently. Hence, there is no need to make room for the actuator between the ports on the exterior surface of the valve housing. Instead the actuator can be arranged next to the ports, such as above, below or besides the ports, wherein a maximum area of each of the ends of the valve housing can be used for the ports and connecting flanges for connection to pipes to and from the device. Hence, according to the invention the area of the ends of the valve housing for the ports are used efficiently. Hence, the invention results in that the device can be reduced in size and weight compared to prior art devices, which saves material and cost and facilitate installation in existing plants as well as in new plants.

Further, the first port or first and second ports being angularly displaced 90° around the centre axis in relation to the third and fourth ports is believed to result an even symmetry and presumably favorable flow properties through the device and a structure which is easy to manufacture and which operates reliably and efficiently. The device can comprise the actuator for rotating the valve member around the axis of rotation. The actuator can be connected to the valve member through the shaft, said shaft extending through the second end of the valve housing, wherein the shaft is arranged coaxial with the axis of rotation. For example, the actuator is arranged entirely outside the valve housing and is not in contact with any medium of the heat exchanger, i.e. any fluid or liquid. The actuator can be mechanically and non-electronically connected to the valve member.

The valve member can comprise a first plate and a second plate forming a dividing wall for dividing the interior of the valve housing into two compartments to reduce pressure drop of the medium flowing through the device. There are two flow paths through the valve housing, i.e. one through the conduit of the valve member and the other outside the valve member inside the valve housing. There can be a considerable pressure drop for the flow through the valve housing outside the valve member. By dividing the interior of the valve housing by means of the first and second plates attached to the valve member the cross section of the flow path through the valve housing can be reduced, wherein the pressure drop is reduced.

The centres of the first and second ports can be arranged on a first imaginary line perpendicular to and crossing the centre axis of the valve housing, and the centres of the third and fourth ports can be arranged on a second imaginary line perpendicular to and crossing the centre axis of the valve housing. In this way the surface of the ends of the valve housing can be used efficiently. The first imaginary line can be perpendicular to the second imaginary line. For example, the first imaginary line can be a vertical line and the second imaginary line can be a horizontal line when the centre axis extends horizontally. Hence, the first port can be an inlet port and the second port can be an outlet port and the first port can be arranged above the second port. Undesired material in the medium flowing through the valve housing outside the conduit of the valve member tend to sink to the bottom of the valve housing, wherein it can be cleansed by the flow and follow the medium out from the valve housing through the lower outlet formed by the second port. The third and fourth ports can be arranged side by side and can be displaced in the lateral direction in relation to each other.

An exterior side of the valve housing ends can be provided with threaded holes, for example, being evenly distributed around the ports and, optionally, having a hole circle being concentric with the ports, respectively. The threaded holes are arranged for receiving bolts or screws to fasten pipes directly to the device without the use of any intermediate connection pipes. Further, connecting flanges can be arranged directly on the valve housing ends. For example, connecting flanges can be fastened to the valve housing ends by screws.

The connections on large pipes are usually arranged as connecting flanges, and prior art devices for reversing flow direction through heat exchangers are generally provided with connection pipes having connecting flanges, which are expensive. The ends of the valve housing can be arranged in carbon steel to keep the cost down, while the projecting connection pipes according to prior art must be corrosive resistant as they are in contact with the fluid flowing through the device. Sometimes it is not suitable to weld such prior art connection pipes to the ends of the valve housing, e.g. as it can be different materials, wherein the connection pipes must be fastened by means of bolted joints. A typical prior art joint can comprise a flange of the same size and material as the as the pipe, said flange being welded to the pipe, the joint further comprising a flange of carbon steel outside the welded flange and a plurality of bolts being fastened to holes in the end of the valve housing. The connection pipe extends through the port in the end of the valve housing and is welded to a plate on the interior of the end of the valve housing. Hence, according to prior art the connection pipe is permanently fixed to the valve housing and cannot be removed by removing the bolts.

According to the present invention, however, two standard type connecting flanges of pipes can be placed next to each other directly on the ends of the valve housing and then fastened to the ends by means of bolts screwed into the holes around the ports, wherein a less expensive and less complicated structure with fewer parts is provided compared to prior art devices of this type.

The present invention also relates to a use of the device as described above for reversing a flow direction of one medium through a heat exchanger. The flow direction can be reversed to remove undesired material, such as particles, fibres or debris, from the heat exchanger. The flow direction can be reversed periodically, on demand or automatically when required, such as by use of appropriate sensors.

Further characteristics and advantages of the present invention will become apparent from the description of the embodiments below, the appended drawings and the dependent claims.

SHORT DESCRIPTION OF THE DRAWINGS

Figure 2:
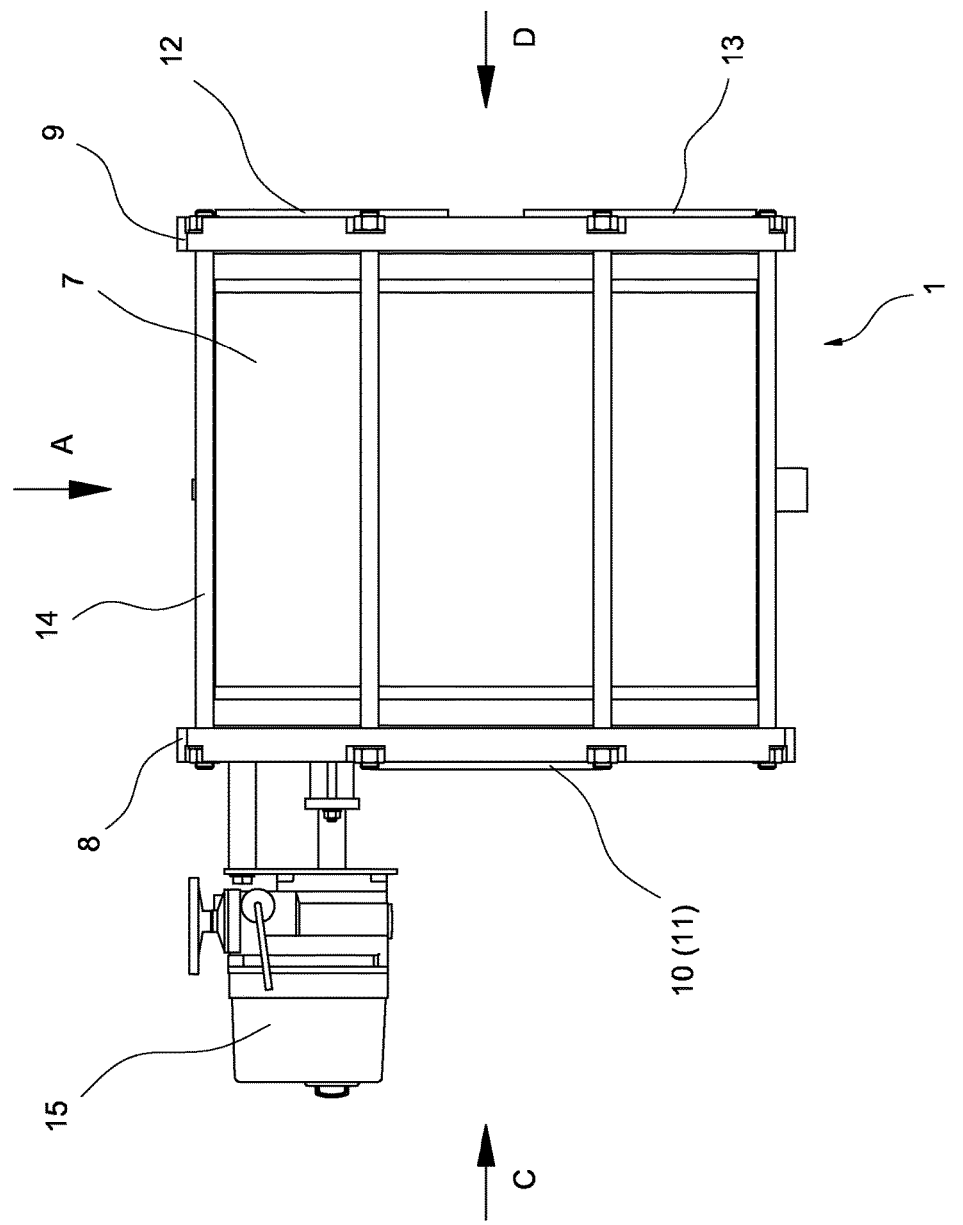
Figure 3:
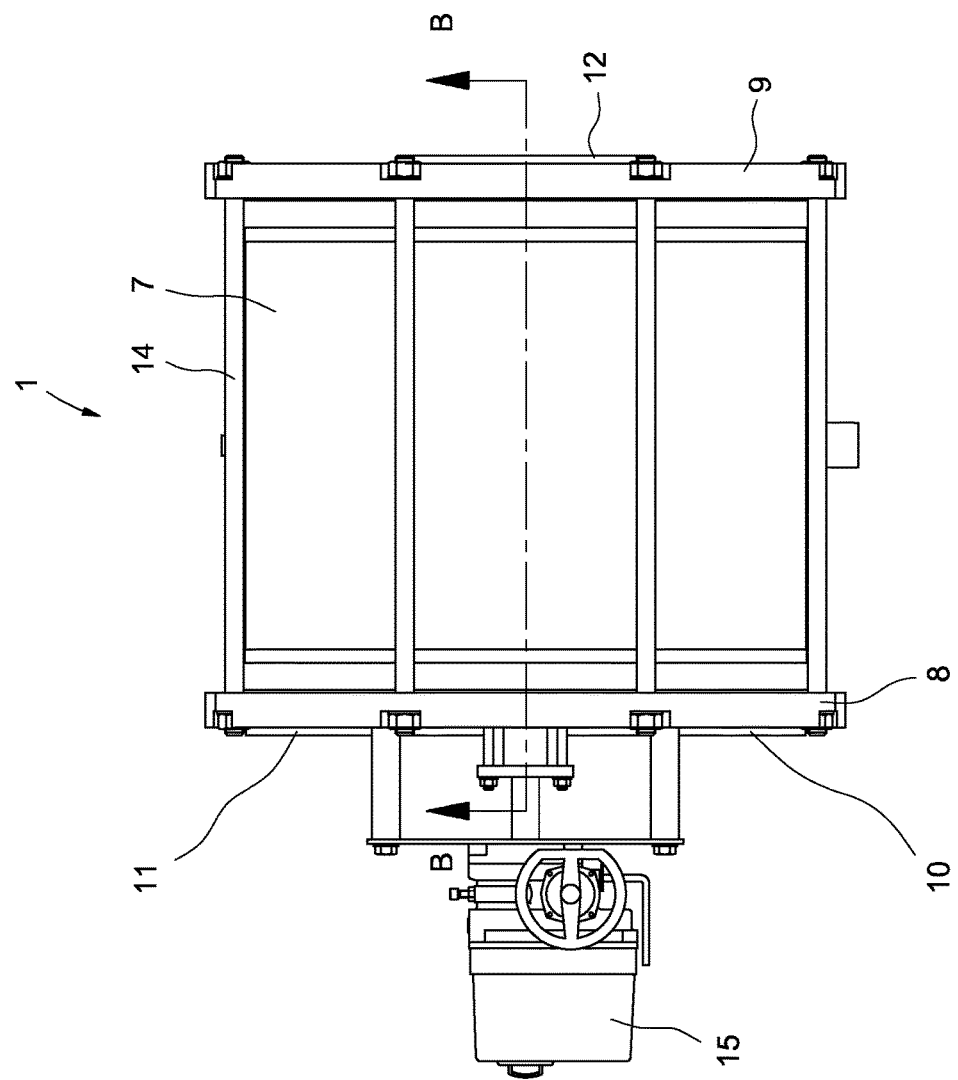
Figure 4:
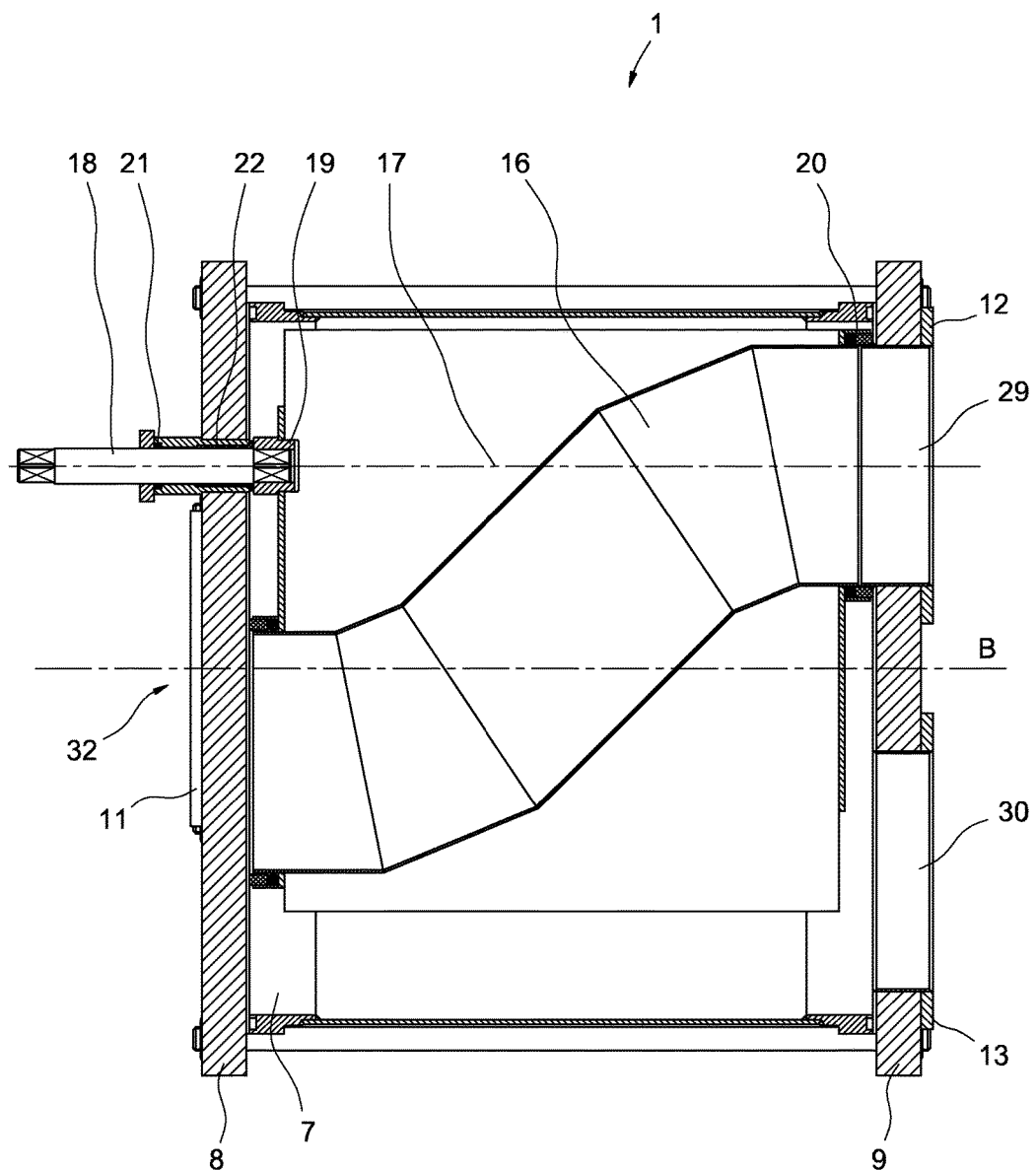
Figure 5:
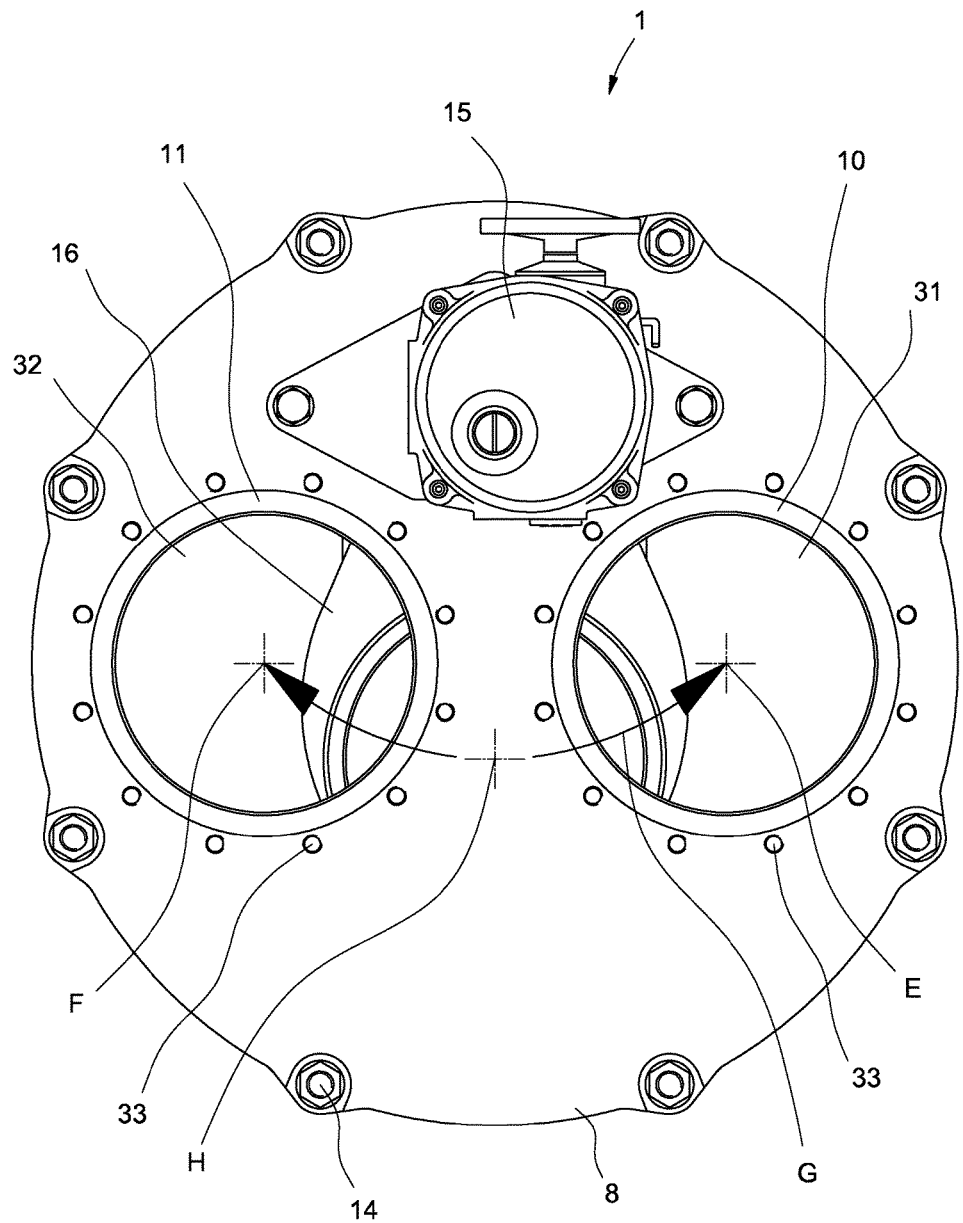
Figure 6:
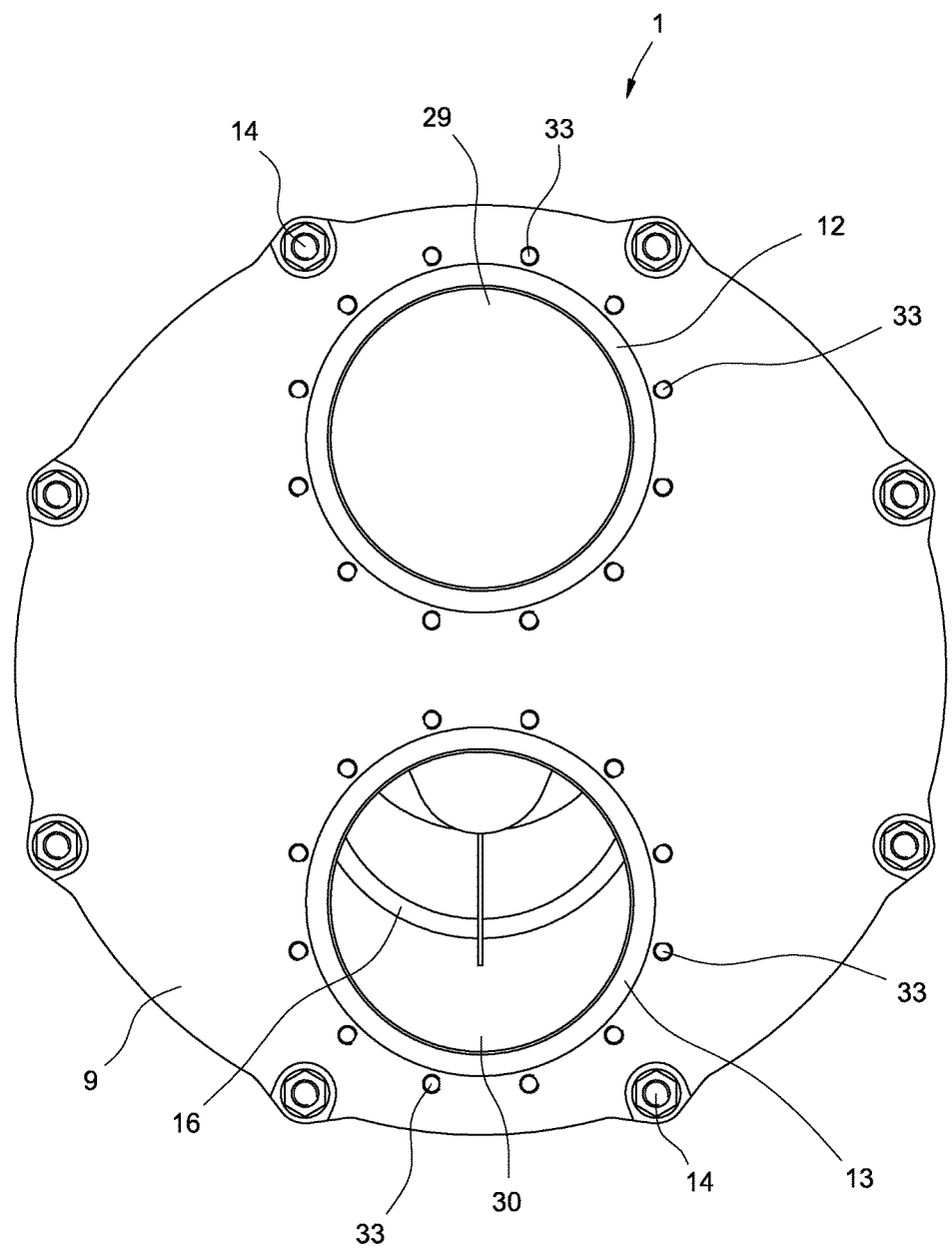
Figure 7:
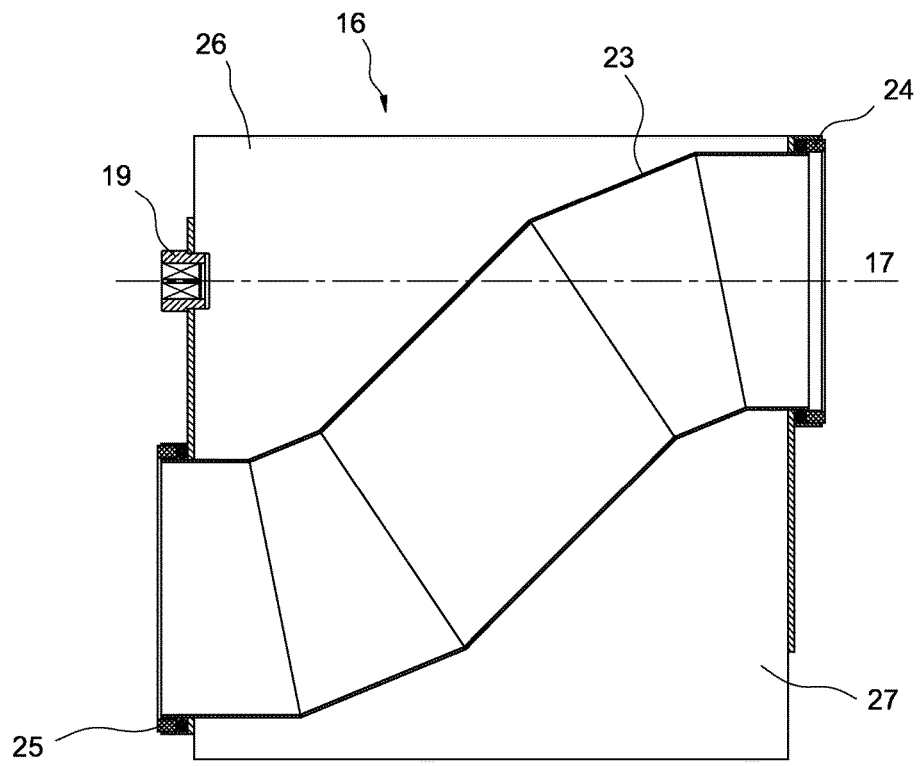
Figure 8:
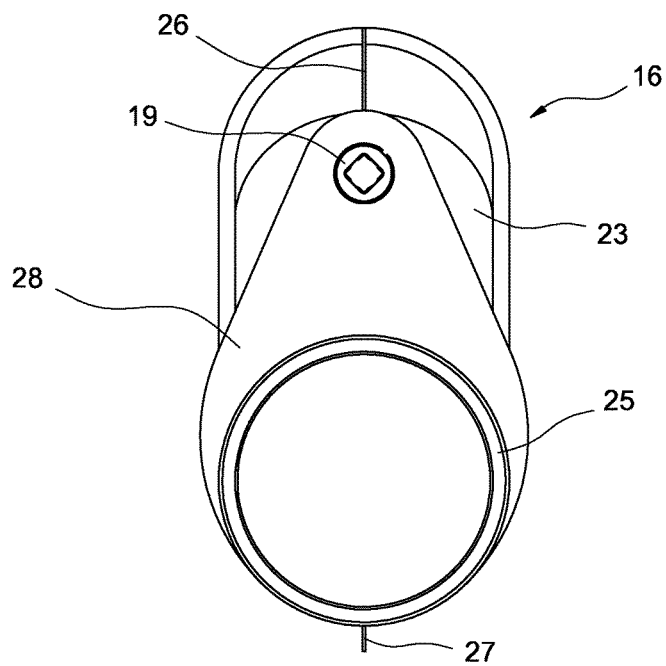
Figure 9:
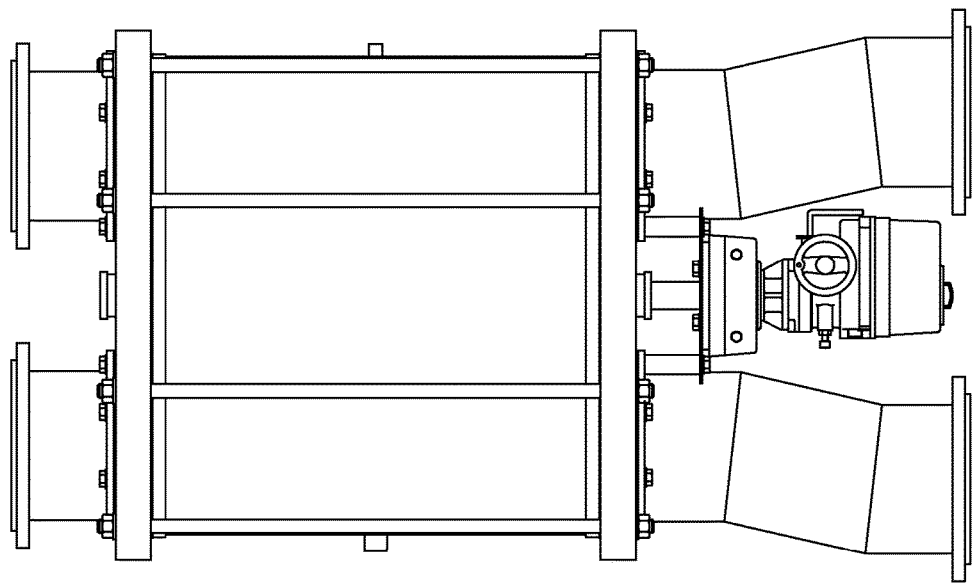
Figure 10:
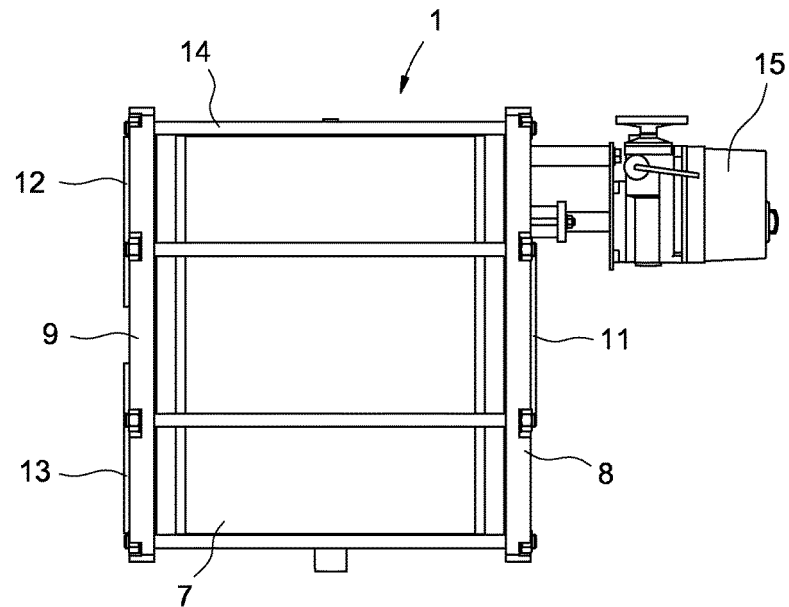

The invention will now be described more in detail with the aid of embodiments and with reference to the appended drawings, in which FIG. 1 is a schematic view of a heat exchanger, a device for changing flow direction through the heat exchanger and pipes connecting the device with the heat exchanger and pipes connecting the device with main pipes according to one embodiment of the present invention, FIG. 2 is a schematic view of the device in FIG. 1, FIG. 3 is a schematic view of the device in the direction of the arrow A in FIG. 2, FIG. 4 is a schematic section view along line B in FIG. 3, illustrating a valve housing and a rotatable valve member of the device, FIG. 5 is a schematic view of a second end of the valve housing of FIG. 2, FIG. 6 is a schematic view of a first end of the valve housing of FIG. 2, FIGS. 7 and 8 are schematic views of the valve member according to one embodiment, FIG. 9 is a schematic view of a prior art device according to SE520124, and FIG. 10 is a schematic view according to FIG. 2 for comparison with the prior art device of FIG. 9.

DETAILED DESCRIPTION OF EMBODIMENTS

Referring to FIG. 1 a device 1 for changing a flow direction of a medium through a heat exchanger 2, such as a plate heat exchanger, is disclosed according to one embodiment example. In FIG. 1 the device 1 is connected to a first pipe 3 for conducting a medium, such as a first medium, to or from the device 1. In the illustrated embodiment the first pipe 3 is connected to a first main pipe 4 for transporting the first medium to or from the first pipe 3. For example, the first pipe 3 is arranged for conducting the first medium to the device 1. The device 1 is further connected to a second pipe 5 for conducting the first medium to or from the device 1. In the illustrated embodiment the second pipe is connected to a second main pipe 6 for transporting the first medium to or from the second pipe 5. For example, the second pipe 5 is arranged for conducting the first medium away from the device 1. The device 1 is further connected to a third pipe 3(5) and a fourth pipe 5(3) connecting the device with the heat exchanger 2. The device 1 is connected to one circuit of the heat exchanger 2 for one medium, wherein pipes of the second circuit for conducting a second medium to and from the heat exchanger 2 are not illustrated in the drawings.

According to the illustrated embodiment example, the first medium is conducted from the first main pipe 4 to the device 1 through the first pipe 3, wherein the first medium is conducted through the device 1 and into the heat exchanger 2 through the third pipe 3(5). For example, the first medium is conducted into a bottom part of the heat exchanger 2. After passing through the heat exchanger 2, the first medium is conducted out from the heat exchanger 2 and to the device 1 through the fourth pipe 5(3), and then to the second main pipe 6 through the second pipe 5. For example, the first medium is conducted out from the heat exchanger through a top part thereof. An example of normal flow operation is illustrated by means of the solid arrows in FIG. 1. When the flow direction of the first medium through the heat exchanger is reversed by means of the device 1, the first medium is conducted from the main pipe 4, through the first pipe 3 to the device 1 and then through the fourth pipe 5(3) into the heat exchanger 2, wherein the first medium is conducted out from the heat exchanger 2 to the device 1 through the third pipe 3(5) and further to the second main pipe 6 through the second pipe 5. An example of reversed flow operation from the heat exchanger 2 to the device 1 is illustrated by means of broken arrows in FIG. 1. For example, during reversed flow, the first medium is conducted into the heat exchanger 2 through the top part thereof, wherein the first medium is conducted out from the heat exchanger 2 through the bottom part thereof. Hence, by means of the device 1 the flow direction of the first medium through the heat exchanger 2 is reversed and then changed back to the original flow direction. For example, the flow direction is changed periodically or when required.

With reference to FIG. 2 the device 1 comprises a valve housing 7 having a second end 8 and a first end 9. For example, the valve housing 7 is formed as a cylinder, e.g. having circular cross section. The first end 9 is arranged opposite the second end 8. For example, the first and second ends 9, 8 are substantially circular. In the illustrated embodiment the device comprises lining rings 10-13 for engagement with the pipes 3(5), 5(3), 3, 5 or connecting flanges thereof. Lining ring 11 is illustrated within parenthesis as it is hidden behind lining ring 10 in FIG. 2. The first and second ends 9, 8 are, for example, connected to each other by a plurality of conventional bolt connections 14, so that a central casing of the valve housing 7 is connected to the first and second ends 9, 8 in a pressure tight connection. For example, the valve housing 7 are made of metal, such as a non-magnetic metal or alloy, such as a nickel steel alloy or titanium. Alternatively, the first and second ends 9, 8 are made of carbon steel.

An actuator 15 for controlling the flow direction is arranged on the valve housing 7. For example, the actuator 15 is arranged on the exterior of the valve housing 7, such as on the exterior of the first or second end 9, 8 thereof. For example, the actuator 15 is arranged on the second end 8 of the valve housing 7, such as at an upper part thereof. The actuator 15 comprises motorized and/or manual devices for operating the device 1, which are arranged outside the valve housing 7. For example, the actuator 15 is made of aluminium or carbon steel.

With reference to FIG. 3 the device 1 is illustrated in the direction of the arrow A in FIG. 2, such as from above, wherein the lining ring 11 is visible. The valve housing 7 has a centre axis represented by the line B in FIG. 3. The centre axis B extends between the first and second ends 9, 8 of the valve housing 7. The centre axis B extends through the centre of the valve housing 7. For example, the centre axis B extends from a centre point of the first end 9 to a centre point of the second end 8.

With reference to FIG. 4 a valve member 16 is arranged within the valve housing 7 between the first and second ends 9, 8 thereof. The valve member 16 forms a conduit for the first medium through the valve housing 7. The valve member 16 is rotatable and can be rotated around an axis of rotation 17. The valve member 16 can be rotated between a first and a second position. For example, the valve member 16 can be rotated 90° around the axis of rotation 17. The rotation of the valve member 16 is provided by the actuator 15, the actuator 15 being connected to the shaft 18 extending through the second end 8 of the valve housing 7 and is connected to a hub 19 of the valve member 16. The valve member 16 is guided by a combined bearing and sealing in ring 20. For example the ring 20 is connected to the valve member 16 through a plate. An o-ring 21 forms a sealing around the shaft 18 which is mounted in a bearing 22. In FIGS. 4-6 the valve member 16 is in a middle position, i.e. between the first and second positions, such as 45° from the first and second positions.

With reference to FIG. 5 the second end 8 of the valve housing 7 according to the embodiment of FIG. 2 is illustrated. By means of the arrows in FIG. 5 the rotation of the valve member 16 is illustrated between the first and second positions E, F along the curved line G. The first and second positions E, F are, for example, end positions and coincide with the centre of the third and fourth pipes 3(5), 5(3), respectively, when said pipes 3(5), 5(3) are connected to the device 1. During operation the valve member 16 is in one of the first and second positions, wherein the position of the valve member 16 is changed for reversing the flow direction through the heat exchanger 2. In the illustrated embodiment the valve member 16 is in position E during normal operation and in position F during reversed flow operation. The point H indicate the centre of an outlet orifice of the valve member 16.

With reference to FIG. 6 the first end 9 of the valve housing 7 according to the embodiment of FIG. 2 is illustrated.

FIGS. 7 and 8 illustrate the valve member 16 according to one embodiment. The valve member 16 comprises a curved conduit 23, such as a pipe, extending between the first and second ends 9, 8 of the valve housing 7. Hence, the conduit 23 has a first end at the first end 9 of the valve housing 7 and a second end at the second end 8 of the valve housing 7. Alternatively, the valve member 16 comprises a straight and inclined conduit, such as a straight pipe having bevelled end portions forming an oblique cylinder shape. The first end portion of the conduit 23 is provided with a combined bearing and sealing 24, wherein the second end portion of the conduit 23 is provided with a sealing 25. For example, the material of the combined bearing and sealing 24 and the sealing 25 has low friction against the interior surface of the ends 9, 8 of the valve housing 7, so that the torque for rotating the valve member 16 can be low.

According to the illustrated embodiment the valve member 16 comprises a first plate 26 and a second plate 27 dividing the interior of the valve housing 7 to reduce the cross section of the flow through the valve housing 7 so as to reduce the pressure drop in the device 1. For example, the first plate 26 and the second plate 27 are arranged in a common plane and extend from opposite sides of the conduit 23, such as a top side and a bottom side, respectively. For example, the first and second plates 26, 27 are fixed to the conduit 23 and rotate along with the conduit 23 when the valve member 16 is rotated. The first and second plates 26, 27 extend along the flow direction through the valve housing 7 outside the conduit 23 of the valve member 16. For example, the first and second plates 26, 27 are arranged in a plane along which the axis of rotation 17 extends. For example, the axis of rotation 17 is horizontal.

In the illustrated embodiment a connecting plate 28 connects the hub 19 with the second end of the conduit 23. The connecting plate 28 is fixed to the conduit 23 and the shaft 18 to the hub 19, wherein the valve member 7 is rotated when the shaft 18 is rotated by means of the actuator 15. The connecting plate 28 extends, for example, perpendicular or at an angle to the shaft 18. For example, the second end of the conduit 23 is arranged below the hub 19. For example, the connecting plate 28 also supports the sealing 25.

Referring back to FIGS. 4-6 the valve housing 7 is provided with a first port 29, a second port 30, a third port 31 and a fourth port 32. The ports 29-32 are arranged for connection to the pipes 3, 5, 3(5), 5(3), respectively, so that the medium is conducted to and from the device 1 through the ports 29-32. For example, the first pipe 3 is arranged for connection to the first port 29, the second pipe 5 is arranged for connection to the second port 30, the third pipe 3(5) is arranged for connection to the third port 31 and the fourth pipe 5(3) is arranged for connection to the fourth port (32). The lining rings 10-13 are arranged around the ports 31, 32, 29, 30, respectively, for engagement with corresponding connection flanges of the pipes 3(5), 5(3), 3, 5. In the illustrated embodiment, the lining rings 10-13 are fastened to port linings extending into the ports 31, 32, 29, 30, for example by welding. For example, the lining rings 10-13 project less than 30 mm, less than 20 mm or less than 10 mm in the axial direction from the exterior surface of the first and second ends 9, 8.

The first and the second ports 29, 30 are arranged in the first end 9 of the valve housing 7, wherein the third and fourth ports 31, 32 are arranged in the second end 8 thereof. Alternatively, the second port 30 is arranged at any other suitable location on the valve housing 7, such as in the lower part thereof. For example, the second port 30 is arranged perpendicular to the first port 29. The centre of the first port 29 is arranged at a distance from the centre axis B of the valve housing 7 and the centre of the second port 30 is arranged at a distance from the centre axis B on the opposite side thereof, so that the first and second ports 29, 30 are displaced in relation to the centre axis B. For example, the distance between the centre of the first port 29 and the centre axis B is equal to the distance between the centre of the second port 30 and the centre axis B. For example, the first port 29 is an inlet port, wherein the second port 30 is an outlet port. For example, the first port 29 is arranged above the second port 30. For example, the centre of the first port 29 and the second port 30 are arranged on a first imaginary line, such as a vertical line, being perpendicular to the centre axis B. For example, the first imaginary line intersects both the centre axis B and the axis of rotation 17. The centre of the third port 31 is arranged at a distance from the centre axis B of the valve housing 7 and the centre of the fourth port 32 is arranged at a distance from the centre axis B on the opposite side thereof, so that the third and fourth ports 31, 32 are displaced in relation to the centre axis B. For example, the distance between the centre of the third port 31 and the centre axis B is equal to the distance between the fourth port 32 and the centre axis B. For example, the centre of third port 31 and the fourth port 32 are arranged on a second imaginary line being perpendicular to the centre axis B and the first imaginary line on which the first and second ports 29, 30 are arranged. The first and second ports 29, 30 are angularly displaced 90° around the centre axis B in relation to the third and fourth ports 31, 32. For example, the second imaginary line on which the centre of the third and fourth ports 31, 32 are arranged is a horizontal line.

The axis of rotation 17 coincides with the centre of the first port 29 and, e.g., extends in parallel to the centre axis B. Hence, the remaining ports 30-32 are offset to the axis of rotation 17. The centre of the third port 31 and the fourth port 32 are arranged with the same distance to the axis of rotation 17. Hence, the third and fourth ports 31, 32 are arranged on an imaginary circle around the axis of rotation 17, which imaginary circle is arranged perpendicular to the axis of rotation 17, to interact with the second end of the conduit 23 when the valve member 16 is rotated between the first and second positions. The curve G of FIG. 5 represents a part of said imaginary circle.

The first end of the conduit 23 of the valve member 16 is connected to the first port 29 and the second end of the conduit 23 is displaceable between the third port 31 and the fourth port 32. Hence the valve member 16 is rotatable between its first position, in which the first medium is conducted from the first port 29 to the third port 31, and its second position, in which the first medium is conducted from the first port 29 to the fourth port 32, for example, for reversed flow through the heat exchanger 2.

Referring back to FIG. 5 the arrows illustrate the rotation of the valve member 16 between the first and second positions E, F along the curved line G, wherein the first and second positions E, F coincide with the third and fourth ports 31, 32, respectively. During operation the valve member 16 is in one of the first and second positions E, F to allow the medium to pass from the first port 29 to the third port 31 or the fourth port 32. The position of the valve member 16 is changed, for example from the third port 31 to the fourth port 32 or vice versa, for reversing the flow direction through the heat exchanger 2.

It is to be understood that the conduit 23 of the valve member 16 is constantly connected to one port of one of the ends 9, 8 of the valve housing 7. In the illustrated embodiment that is the first port 29. However, the conduit 23 of the valve member 16 can be constantly connected to any of the ports 29-32, provided that said port is arranged in one of the ends 9, 8, and then rotated between the two ports of the opposite end of the valve housing 7.

With reference particularly to FIGS. 5 and 6 the first and second ends 9, 8 of the valve housing 7 comprise threaded holes 33. The holes 33 are arranged on an exterior side of the first and second ends 9, 8 to receive bolts for connecting the pipes 3, 5, 3(5), 5(3) to the device 1. Hence, the holes 33 are arranged for forming a bolt joint with a connecting flange of the pipes 3, 5, 3(5), 5(3) to be connected with the device 1. For example, the holes 33 are distributed around the ports, 29-32, respectively, such as around the lining ring 12, 13, 10, 11 around each of the ports 29-32.

FIGS. 9 and 10 is a comparison between the device 1 according to the invention, which is illustrated in FIG. 10, with a prior art device according to SE520124.

The invention claimed is:

1. A device for changing a flow direction through a heat exchanger, comprising:
   a valve housing and a rotatable valve member arranged inside the valve housing, said valve housing comprising a first end, a second end and a center axis extending between said first and second ends;
   a first port, a second port, a third port and a fourth port, said first end being provided with the first port, and said second end being provided with the third port and the fourth port, wherein the valve member is rotatable between a first position and a second position and, in the first position, defines a conduit between the first port and the third port and, in the second position, defines a conduit between the first port and the fourth port, wherein
   the valve member is rotatable around an axis of rotation offset from the center axis, said axis of rotation extending through the center of the first port, and the first port is angularly displaced 90° around the center axis in relation to the third and fourth ports, wherein the valve member comprises a first plate and a second plate forming a dividing wall for dividing the interior of the valve housing into two compartments.

2. The device according to claim 1, wherein the axis of rotation is parallel to the centre axis.

3. The device according to claim 1, wherein the second port is arranged in the first end of the valve housing.

4. The device according to claim 3, wherein the first and second ports are angularly displaced 90° around the centre axis in relation to the third and fourth ports.

5. The device according to claim 1, comprising an actuator for rotating the valve member around the axis of rotation, said actuator being connected to the valve member through a shaft extending through the second end of the valve housing, wherein the shaft is arranged coaxial with the axis of rotation.

6. The device according to claim 5, wherein the conduit of the valve member comprises a first end continuously being connected to the first port and a second end being displaceable between the third and fourth ports, and wherein the valve member is connected to the shaft through a connecting plate at the second end of the conduit.

7. The device according to claim 1, wherein the first plate and the second plate are arranged in a common plane extending through the axis of rotation.

8. The device according to claim 1, wherein the centres of the first and second ports are arranged on a first imaginary line perpendicular to and crossing the centre axis of the valve housing, and wherein the centres of the third and fourth ports are arranged on a second imaginary line perpendicular to and crossing the centre axis of the valve housing.

9. The device according to claim 8, wherein the first imaginary line is perpendicular to the second imaginary line.

10. The device according to claim 1, wherein the first port is an inlet port and the second port is an outlet port.

11. The device according to claim 1, wherein the first port is arranged above the second port.

12. The device according to claim 1, wherein an exterior side of the valve housing ends are provided with threaded holes for forming a bolt joint with a connecting flange of a pipe to be connected with the device.

* * * * *